United States Patent
Kang et al.

(10) Patent No.: US 7,131,456 B2
(45) Date of Patent: Nov. 7, 2006

(54) MASS FLOW CONTROLLER

(75) Inventors: Sung-Ho Kang, Osan-si (KR); Sung-Wook Jung, Suwon-si (KR); In-Pil Cha, Osan-si (KR); Cheol-Kyu Yang, Osan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 322 days.

(21) Appl. No.: 10/785,631

(22) Filed: Feb. 24, 2004

(65) Prior Publication Data

US 2004/0187927 A1   Sep. 30, 2004

(30) Foreign Application Priority Data

Mar. 28, 2003   (KR) .................. 10-2003-0019596

(51) Int. Cl.
*G05D 7/06*   (2006.01)
(52) U.S. Cl. ............... 137/487.5; 137/613; 138/40; 251/120; 251/127
(58) Field of Classification Search ........... 137/487.5, 137/613; 251/118, 126, 127; 138/40–46
See application file for complete search history.

(56) References Cited

U.S. PATENT DOCUMENTS

| | | | | |
|---|---|---|---|---|
| 4,858,643 A | * | 8/1989 | Vavra et al. ............... | 137/486 |
| 5,080,131 A | * | 1/1992 | Ono et al. ............... | 137/599.11 |
| 6,247,495 B1 | * | 6/2001 | Yamamoto et al. .... | 137/599.13 |
| 6,889,706 B1 | * | 5/2005 | Fukano et al. ........... | 137/487.5 |
| 2004/0261705 A1 | * | 12/2004 | Kang et al. ................. | 118/715 |

FOREIGN PATENT DOCUMENTS

| | | |
|---|---|---|
| JP | 62112710 | 7/1987 |
| JP | 04082706 | 9/1992 |
| JP | 07005929 A * | 1/1995 |

OTHER PUBLICATIONS

English Abstract***.

* cited by examiner

*Primary Examiner*—Ramesh Krishnamurthy
(74) *Attorney, Agent, or Firm*—F. Chau & Associates, LLC

(57) ABSTRACT

A mass flow controller includes a base having a passage that allows a fluid to pass through the passage. A first control valve controls a mass flow of a fluid passing through the passage. A second control valve controls a full scale of the mass flow of the fluid. A bypass portion is disposed in the passage through which the fluid passes. A mass flow sensor measures the mass flow of the fluid passing through the bypass portion. The second control valve is connected to the passage adjacent to the bypass portion for controlling the full scale of the mass flow of the fluid passing through the bypass portion.

11 Claims, 9 Drawing Sheets

MASS FLOW CONTROLLER

CROSS REFERENCE TO RELATED APPLICATION

This application claims priority under 35 U.S.C. § 119 to Korean Patent Application No 2003-19596, filed on Mar. 28, 2003, which is incorporated herein by reference in its entirety.

BACKGROUND OF THE INVENTION

1. Field of the Invention

The present invention relates, generally, to a mass flow controller, and more particularly to a controller for controlling a mass flow of a fluid by measuring the mass flow of the fluid and then by comparing the measured mass flow to a standard flow.

2. Description of the Related Art

Generally, various kinds of gases are used in semiconductor fabricating processes. A mass flow controller controls mass flows of the gases. As semiconductor devices have become more highly integrated, requirements for controls to accurately measure and control the mass flows of gases to semiconductor fabricating processes have increased.

FIG. 1 is a sectional view illustrating a conventional mass flow controller, and FIG. 2 is a partially enlarged view illustrating a mass flow sensor of the conventional mass flow controller of FIG. 1.

Referring to FIGS. 1 and 2, a base 110 of a conventional mass flow controller 100 has a passage 112 through which a fluid passes, an inlet portion 114 for introducing the fluid into the passage 112 and an outlet portion 116 for releasing the fluid from the passage 112.

A bypass portion 120 through which the fluid passes is formed in the passage 112 adjacent to the inlet portion 114. A sampling pipe 132 is connected to the passage 112. Particularly, the sampling pipe 132 is connected between a first portion adjacent to an inlet end of the bypass portion 120 and a second portion adjacent to an outlet portion of the bypass portion 120, thereby allowing a sample of the fluid passing through the bypass portion 120 to pass through the sampling pipe 132.

A mass flow sensor 130 measures a mass flow of the fluid passing through the bypass portion 120. The mass flow sensor 130 includes a first thermal resistance 134a and a second thermal resistance 134b, wherein the first thermal resistance 134a and the second thermal resistance 134b are wound around the sampling pipe 132. The first thermal resistance 134a and the second thermal resistance 134b comprising Pt or other metals similar to Pt are connected to a bridge circuit 136. A control valve 140, e.g., a solenoid valve, is connected between the bypass portion 120 and the outlet portion 116.

When the first thermal resistance 134a and the second thermal resistance 134b are heated, a temperature difference proportional to the mass flow of the fluid is generated between an upper stream and a lower stream of the sampling pipe 132. Therefore, resistance values of the first thermal resistance 134a and the second thermal resistance 134b are different from each other. The bridge circuit 136 detects the different resistance values as an electric signal. The detected signal is amplified through an amplifier (not shown). The compensator compensates the amplified signal to correspond to the mass flow of the fluid.

The measured signal indicating the mass flow of the fluid is transmitted to a valve controller (not shown). The valve controller compares the measured signal to a predetermined standard flow. The valve controller controls operations of a control valve 140 to correspond the measured signal to the standard signal.

Full scale of the mass flow of the fluid is determined according to a volume of the bypass portion 120. The full scale may not be readily controlled. In the meantime, the semiconductor fabricating processes contain various kinds of lot processes. Also, various kinds of gases are used in the fabricating processes. In addition, the gases supplied to a semiconductor substrate to perform the fabricating processes have different mass flows from one other. Accordingly, there exists a problem that the conventional mass flow controller 100 may not be applied to the various processes.

Therefore, a need exist for a mass flow control that can control a full scale of a mass flow and the mass flow of the various kinds of gases used in the various processes of semiconductor fabrication.

SUMMARY OF THE INVENTION

Exemplary embodiments of the present invention include a mass flow controller that is capable of controlling a full scale of a mass flow and the mass flow of a fluid.

According to an exemplary embodiment of the present invention, a mass flow controller includes a base having a passage through which a fluid passes, an inlet portion for introducing the fluid into the passage and an outlet portion for releasing the fluid from the passage. A mass flow sensor is connected to the passage adjacent to the inlet portion, which measures a mass flow of the fluid passing through the passage. A first control valve is connected to the passage adjacent to the outlet portion, which controls the mass flow of the fluid passing through the passage. A valve controller compares the mass flow measured by the mass flow sensor to a standard flow, and then controls the first control valve to correspond the measured mass flow to the standard flow. A second control valve is connected to the passage adjacent to the inlet portion, which controls a full scale of the mass flow of the fluid passing through the passage.

A mass flow controller according to an embodiment of the invention controls the full scale of the mass flow of the fluid and can be employed in semiconductor fabricating processes using various kinds of gases.

These and other exemplary embodiments, features, aspects, and advantages of the present invention will be described and become readily apparent from the following detailed description of exemplary embodiments when read in conjunction with the accompanying drawings.

DETAILED DESCRIPTION OF EXEMPLARY EMBODIMENTS

Hereinafter, the present invention will be explained in detail with reference to the accompanying drawings.

Figure 1:
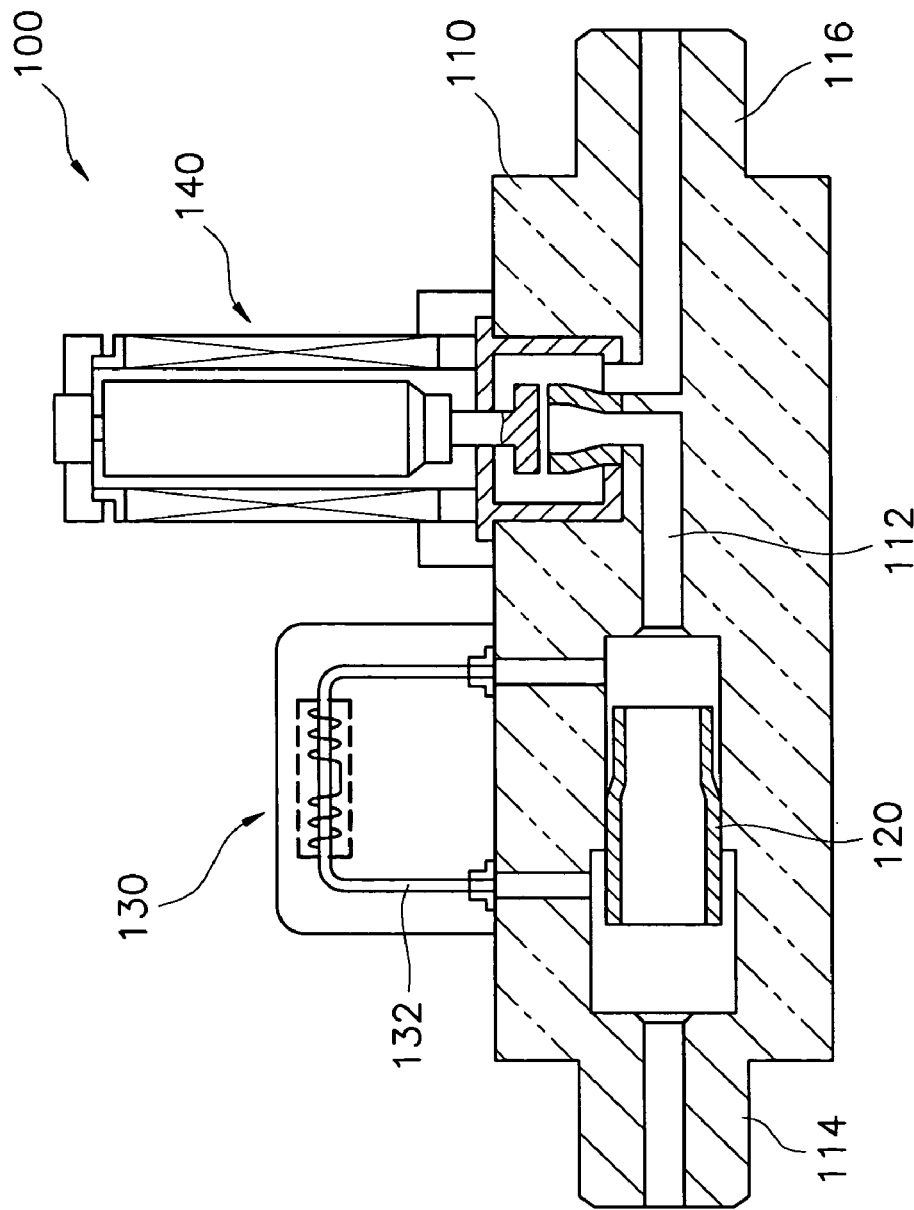
FIG. 1 is a sectional view illustrating a conventional mass flow controller.
Figure 2:
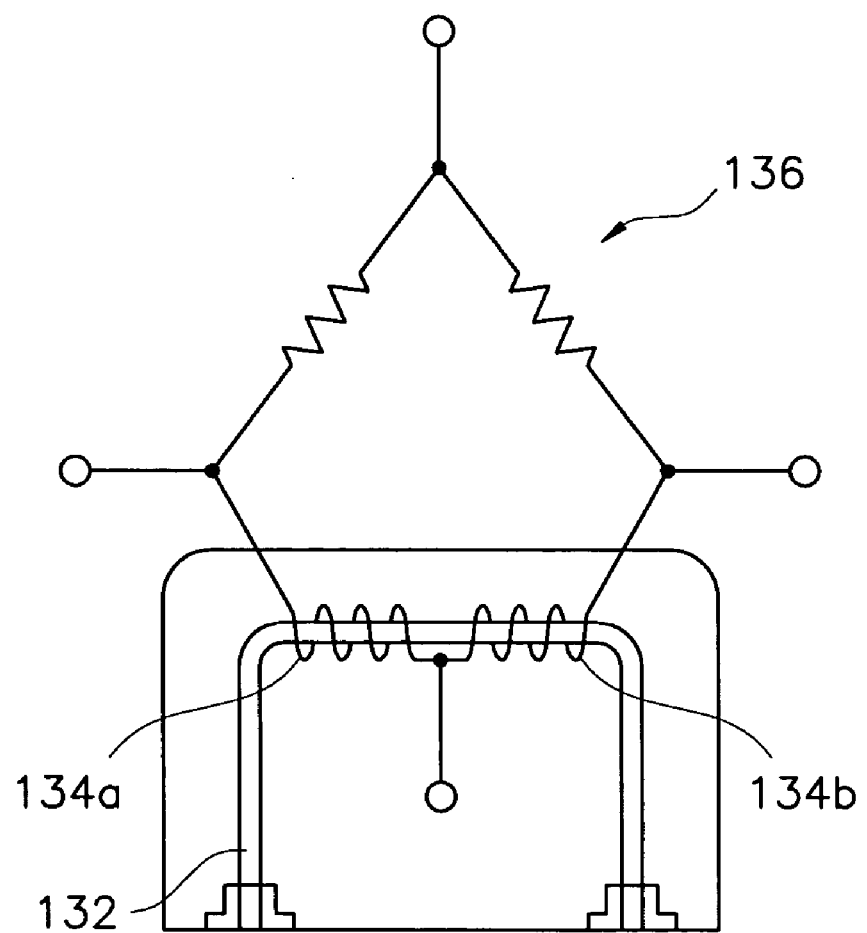
FIG. 2 is a partially enlarged view illustrating a mass flow sensor of the conventional mass flow controller of FIG. 1.
Figure 3:
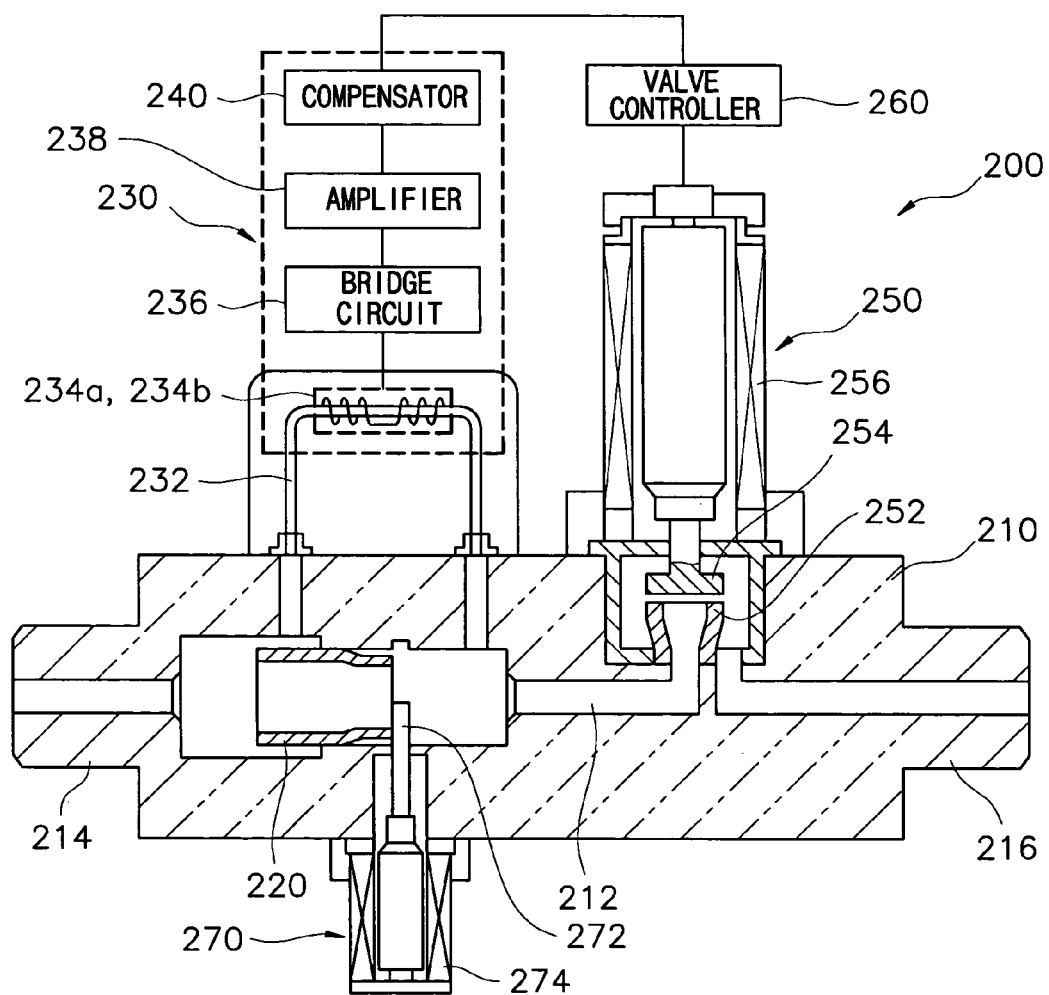
FIG. 3 is a schematic sectional view illustrating a mass flow controller according to an exemplary embodiment of the invention.
Figure 4:
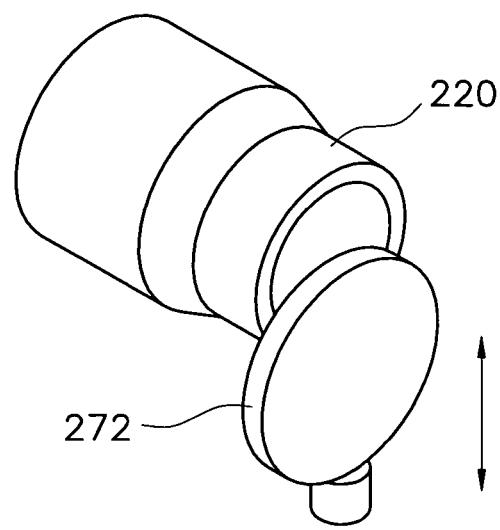
FIG. 4 is a perspective view illustrating a bypass portion and a second valve body of FIG. 3.

FIG. 3 is a schematic sectional view illustrating a mass flow controller according to an exemplary embodiment of the invention, and FIG. 4 is a perspective view illustrating a bypass portion and a second valve body of FIG. 3.

Referring FIGS. 3 and 4, a mass flow controller 200 according to an exemplary embodiment is connected to a fluid pipe (not shown) for supplying a fluid. For example, the mass flow controller 200 is connected to the fluid pipe for supplying semiconductor fabricating equipment with processing gases, thereby controlling the mass flow of the gases. The mass flow controller 200 includes a base 210, a mass flow sensor 230, a first control valve 250, a valve controller 260 and a second control valve 270.

The base 210 is connected to the fluid pipe. The base 210 has a long passage 212 through which the fluid passes, an inlet portion 214 for introducing the fluid into the passage 212 from the fluid pipe and an outlet portion 216 for releasing the fluid from the passage 212.

The mass flow sensor 230 is connected to the passage 212 adjacent to the inlet portion 214, thereby measuring the mass flow of the fluid passing through the passage 212. The mass flow sensor 230 includes a sampling pipe 232, a first thermal resistance 234a and a second thermal resistance 234b coiled around the sampling pipe 232, respectively, a bridge circuit 236 connected to the first thermal resistance 234a and the second thermal resistance 234b, an amplifier 238 connected to the bridge circuit 236 and a compensator connected to the amplifier 238.

Particularly, a bypass portion 220 through which the fluid passes is disposed in the passage 212 adjacent to the inlet portion 214. The sampling pipe 232 for sampling the fluid passing through the bypass portion 220 is connected between a first portion of the passage 212 between the inlet portion 214 and the bypass portion 220 and a second portion of the passage 212 between the bypass portion 220 and the first control valve 250.

The first thermal resistance 234a is wound (as a coil) on an upper stream of the sampling pipe 232 and the second thermal resistance 234b is wound on a lower stream of the sampling pipe 232. When the first thermal resistance 234a and the second thermal resistance 234b are heated, the bridge circuit 236 generates an electric signal corresponding to a temperature difference between the upper stream and the lower stream of the sampling pipe 232.

The amplifier 238 amplifies the electric signal detected by the bridge circuit 236. The compensator 230 compensates the amplified electric signal to correspond to the mass flow of the fluid passing through the bypass portion 220.

The first control valve 250 includes a valve seat 252, a first valve body 254 and a first driving unit 256. The valve seat 252 is disposed in the passage 212 between the lower stream of the sampling pipe 232 and the outlet portion 216 of the base 210. Preferably, the first valve body 254 has a valve head having a disk shape. The first driving unit 256 drives the first valve body 254 to properly adjust the opening of the first control valve 250. The first driving unit 256 may include a solenoid. In addition, the first valve body 254 may have a poppet valve head having a cone shape.

The configuration of the first control valve 250 may be varied depending upon the kind of first driving unit 256 employed. For example, the first control valve 250 may include a thermal valve including a thermal type driving unit or a piezoelectric valve having a piezoelectric stack composed of a plurality of piezoelectric elements.

The valve controller 260 controls the operation of the first control valve 250. In particular, the valve controller 260 receives the signal compensated by the compensator 240. The valve controller 260 compares a standard signal corresponding to a predetermined standard flow with the compensated signal, and then controls the operation of the first control valve 250 to correspond the mass flow measured by the mass flow sensor 230 to the predetermined standard flow.

The second control valve 270 is connected to the passage 212 adjacent to the inlet portion 214. Particularly, the second control valve 270 is connected to the passage 212 between the bypass portion 220 and a releasing end of the sampling pipe 232, thereby controlling a full scale of the mass flow of the fluid passing through the bypass portion 220. The second control valve 270 includes a second valve body for controlling an opened sectional area of the passage 212 and a second driving unit 274 traversing the passage 212 with the second valve body 272.

The passage 212 has a circular section. The second valve body 272 has a disk shape corresponding to the circular section of the passage 212. The second driving unit 274 having a solenoid provides a driving force to the second valve body 272. The second valve body 272 makes contact with the releasing end of the bypass portion 220. Alternatively, the second valve body 272 may be disposed apart from the releasing end of the bypass portion 220. Also, the second control valve 270 may be adjacently disposed at the inlet end of the bypass portion 220.

Figure 5:
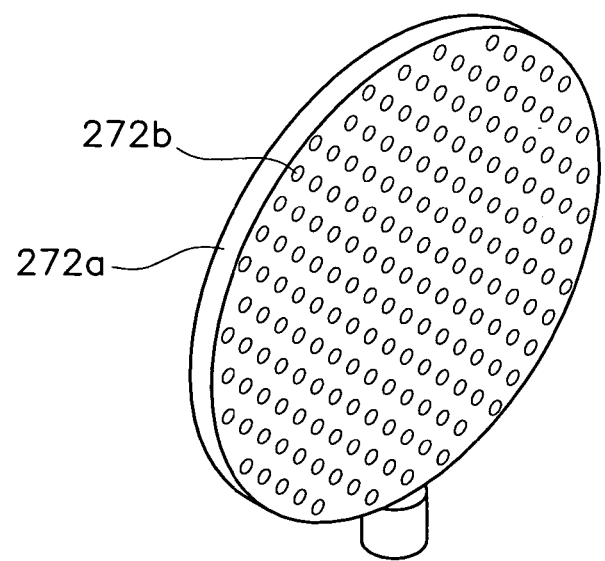
FIG. 5 is a perspective view illustrating a second valve body according to a variation of FIG. 3.

To stabilize the fluid passing through the passage 212 to the sampling pipe 232, it is preferred that the fluid passing through the passage 212 is under a laminar flow condition. As shown in FIG. 5, to create the laminar flow condition with in the passage 212, a second valve body 272a including a plurality of holes 272b may be employed. On the other hand, the valve controller 260 may control the second control valve 270.

According to another exemplary embodiment, the second control valve 270 controls the full scale of the mass flow of the fluid passing through the mass flow controller 200. For example, when the full scale of the mass flow of the fluid is set to about 100 sccm by the second control valve 270, the first control valve 250 controls the mass flow of the fluid to be below about 100 sccm. When the full scale of the mass flow of the fluid is set to about 1,000 sccm by the second control valve 270, the first control valve 250 controls the mass flow of the fluid to be below about 1,000 sccm.

Since the second control valve 270 previously determines the full scale of the mass flow of the fluid, the mass flow controller 270 may be employed in semiconductor fabricating processes using various kinds of gases.

Figure 6:
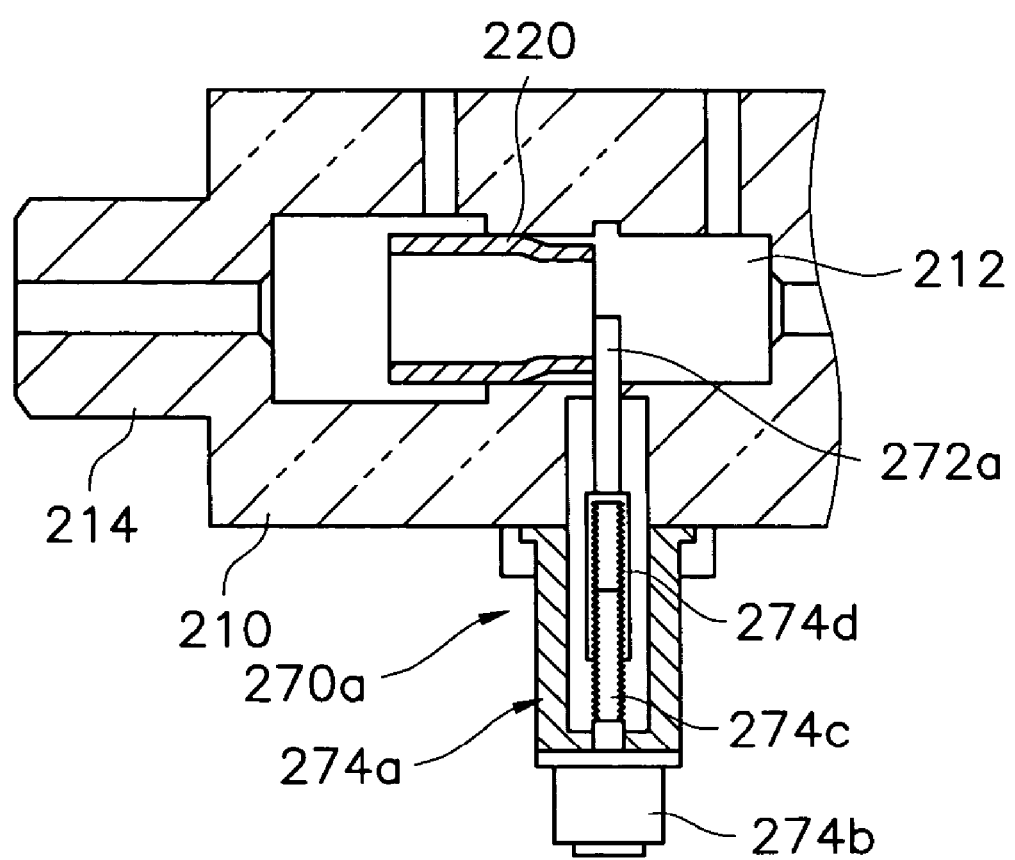
FIG. 6 is a schematic sectional view illustrating a second valve body according to another variation of FIG. 3.

FIG. 6 is a schematic sectional view illustrating a second valve body according to another variation of FIG. 3.

Referring FIG. 6, a second control valve 270a includes a valve body 272a for controlling the full scale of the mass flow of the fluid passing through the passage 212 and a driving unit 274a for moving the valve body 272a. The driving unit 274a includes a motor 274b, a driving screw 274c and a driven screw 274d.

The valve body 272a may have a disk shape and may also include a plurality of holes, as shown in FIG. 5. The valve body 272a makes contact with the releasing end of the bypass portion 220. Alternatively, the valve body 272a may be spaced apart from the releasing end of the bypass portion 220.

The motor 274b provides a driving force to the valve body 272a. The motor 274b may include a step motor capable of controlling a rotation angle of the valve body 272a. The driving screw 274c is connected to the motor 274b, thereby transmitting the driving force to the driven screw 274d. The driven screw 274d is connected between the driving screw 274c and the valve body 272a. The driving force is applied to the driven screw 274d so that the drive screw 274d is reciprocally moved.

Figure 7:
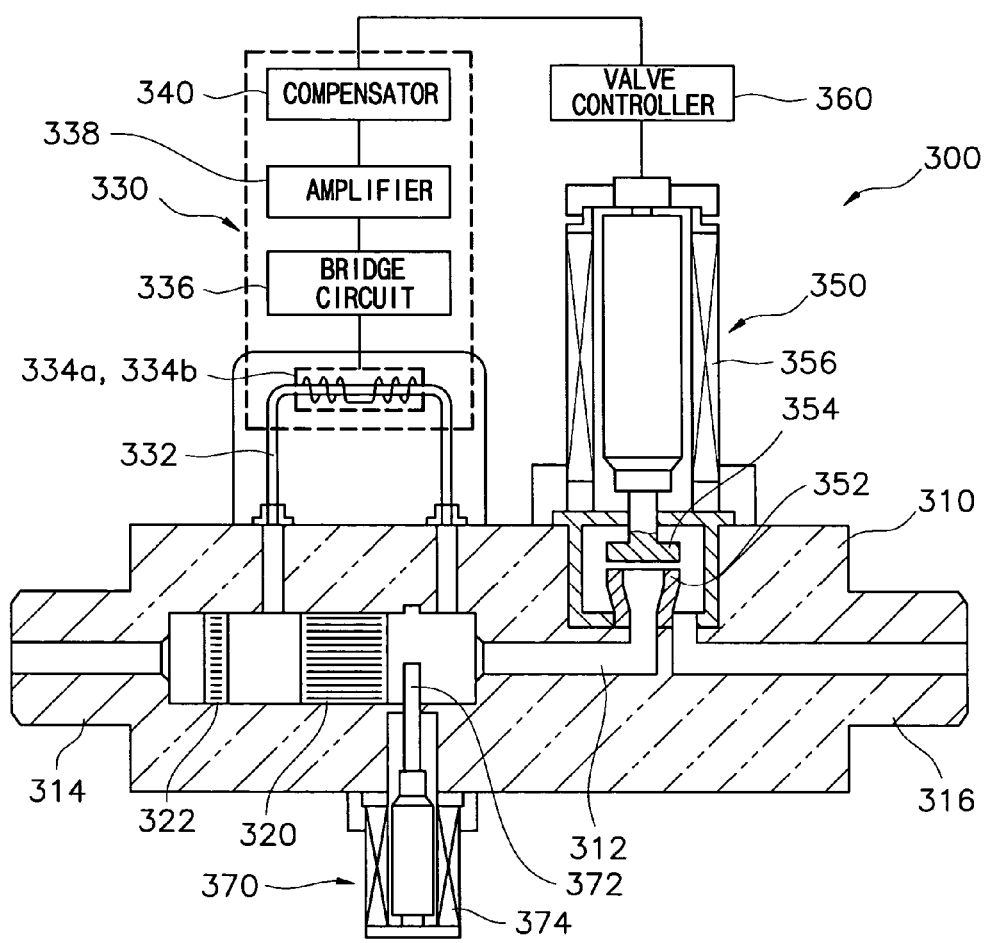
FIG. 7 is a schematic sectional view illustrating a mass flow controller according to another exemplary embodiment of the invention.

FIG. 7 is a schematic sectional view illustrating a mass flow controller according to another exemplary embodiment of the invention.

Referring to FIG. 7, a mass flow controller 300 according to another exemplary embodiment includes a base 310, a mass flow sensor 330, a first control valve 350, a valve controller 360 and a second control valve 370.

The base 310 connected to a fluid pipe has a long passage 312 through which a fluid passes, an inlet portion 314 for introducing the fluid from the fluid pipe into the passage 312 and an outlet portion 316 for releasing the fluid from the passage 312. A capillary bypass portion 320 is disposed in the passage 312 adjacent to the inlet portion 314. The capillary bypass portion 320 forms a laminar flow condition in the passage 312.

A mass flow sensor 330 includes a sampling pipe 332, a first thermal resistance 334a, a second thermal resistance 334b, a bridge circuit 336, an amplifier 338 and a compensator 340. The sampling pipe 332 is connected between a first portion of the passage 312 adjacent to an inlet end of the capillary bypass portion 320 and a second portion of the passage 312 adjacent to a releasing end of the capillary bypass portion 320. Another capillary bypass portion 322 may be further installed between the inlet portion 314 of the base 310 and the capillary bypass portion 320.

The valve controller 360 compares a signal corresponding to the mass flow measured by the mass flow sensor 330 with a standard signal corresponding to a standard flow, and then controls the operation of the first control valve 350. The valve controller 360 properly controls the mass flow of the fluid passing through the passage 312.

The first control valve 350 includes a valve seat 352, a first valve body 354 for controlling the mass flow of the fluid passing through the passage 312 and a first driving unit 356 for driving the first valve body 354. The second control valve 370 includes a second valve body 372 for controlling the full scale of the mass flow of the fluid passing through the capillary bypass portion 320 and a second driving unit 374 for driving the second valve body. Here, the second valve body 372 may include a plurality of holes, as shown in FIG. 5. According to another exemplary embodiment, the second control valve 270a of FIG. 6 may be employed in the mass flow controller 300 of FIG. 7.

Since the elements according to another embodiment are previously described in relation to the mass flow controller 200 of FIG. 3, illustrations of the elements are omitted.

Figure 8:
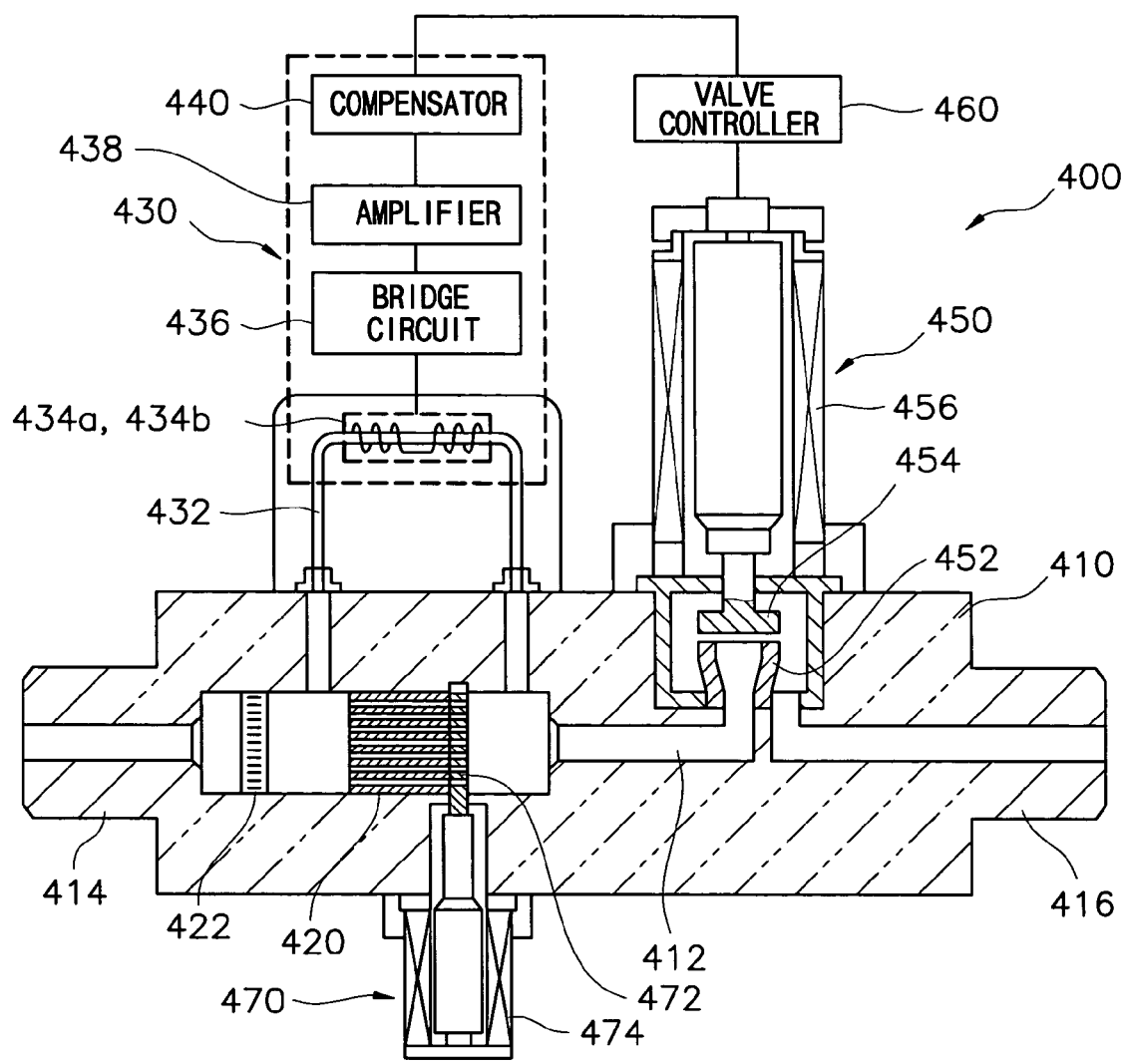
FIG. 8 is a schematic sectional view illustrating a mass flow controller according to still another exemplary embodiment of the invention.
Figure 9:
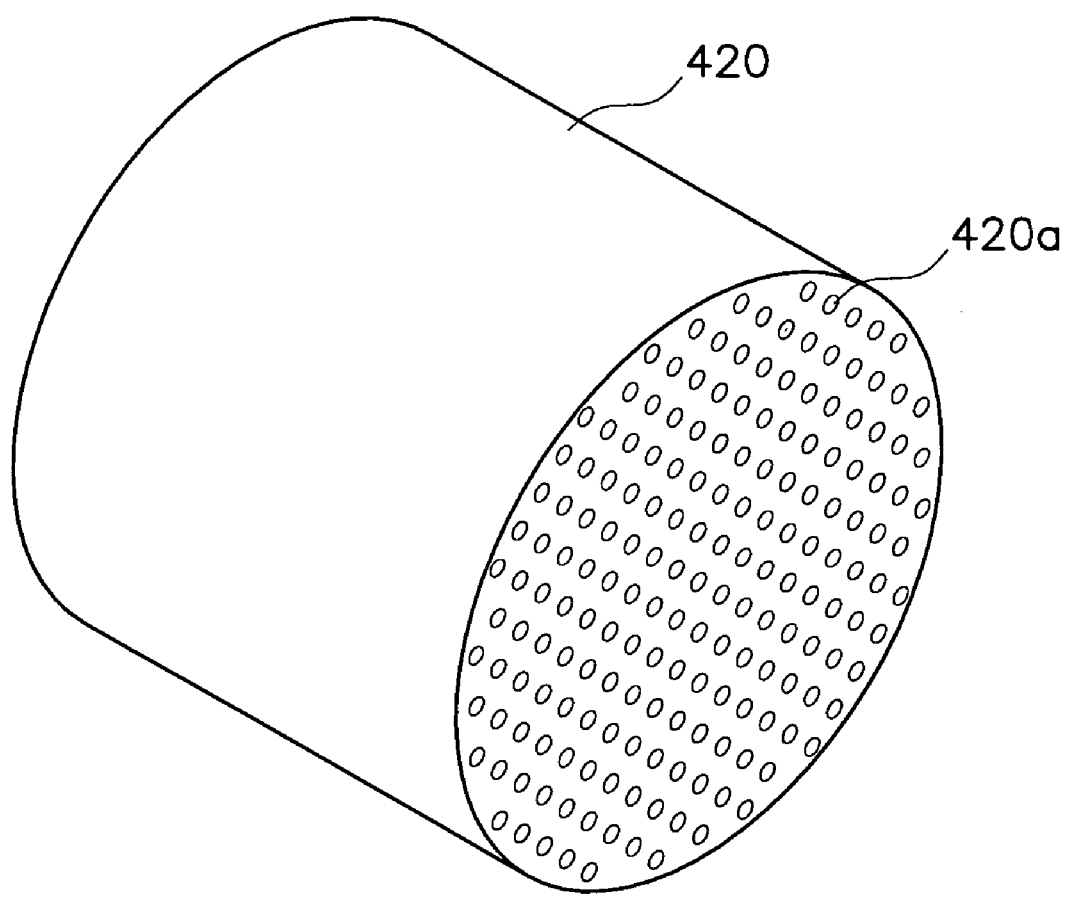
FIG. 9 is a perspective view illustrating a bypass portion of FIG. 8.

FIG. 8 is a schematic sectional view illustrating a mass flow controller according to still another exemplary embodiment of the invention, and FIG. 9 is a perspective view illustrating a bypass portion of FIG. 8.

Referring to FIGS. 8 and 9, a mass flow controller 400 according to still another exemplary embodiment includes a base 410, a mass flow sensor 430, a first control valve 450, a valve controller 460 and a second control valve 470.

The base 410 connected to a fluid pipe has a long passage 412 through which a fluid passes, an inlet portion 414 for introducing the fluid from the fluid pipe to the passage 412 and an outlet portion 416 for releasing the fluid from the passage 412.

A porous bypass portion 420 is disposed in the passage 412 adjacent to the inlet portion 414. The porous bypass portion 420 formed of a cylindrical shape has a plurality of second passages 420a, as shown in FIG. 9. The second passages 420a form a laminar flow condition in the passage 412.

A mass flow sensor 430 includes a sampling pipe 432, a first thermal resistance 434a, a second thermal resistance 434b, a bridge circuit 436, an amplifier 438 and a compensator 440. The sampling pipe 432 is connected between a first portion of the passage 412 adjacent to an inlet end of the porous bypass portion 420 and a second portion of the passage 412 adjacent to a releasing end of the porous bypass portion 420. In addition, another porous bypass portion 422 may be installed between the inlet portion 414 of the base 410 and the porous bypass portion 420.

The valve controller 460 compares a signal corresponding to the mass flow measured by the mass flow sensor 430 with a standard signal corresponding to a standard flow, and then controls the operation of the first control valve 450. The valve controller 460 properly controls the mass flow of the fluid passing through the passage 412.

The first control valve 450 includes a valve seat 452, a first valve body 454 for controlling the mass flow of the fluid passing through the passage 412 and a first driving unit 456 for driving the first valve body 454. The second control valve 470 includes a second valve body 472 for controlling the full scale of the mass flow of the fluid passing through the porous bypass portion 420 and a second driving unit 474 for driving the second valve body 472. The second valve body 472 has a plurality of holes corresponding to the second passages 420a of the porous bypass portion 420 as shown in FIG. 8.

The second driving unit 474 moves the second valve body 472 to control the full scale of the mass flow of the fluid passing through the second passages 420a of the porous bypass portion 420 and the holes of the second valve body 472. The second driving unit 474 varies relative positions between the porous bypass portion 420 and the second valve body 472 so that the opened sectional area of the second passages 420a is altered.

The second driving unit 474 includes a solenoid. The step motor type of the second driving unit 274a of FIG. 6 may be employed in the second control valve 470. Since the moving distance of the second valve body 472 is relatively shorter than that of the second valve body 272 or 372, the second driving unit 474 may further include a thermal type or a piezoelectric type of driving unit.

Since the elements according to still another exemplary embodiment are previously described in relation to the mass flow controller 200 of FIG. 3, illustrations of the elements are omitted.

Figure 10:
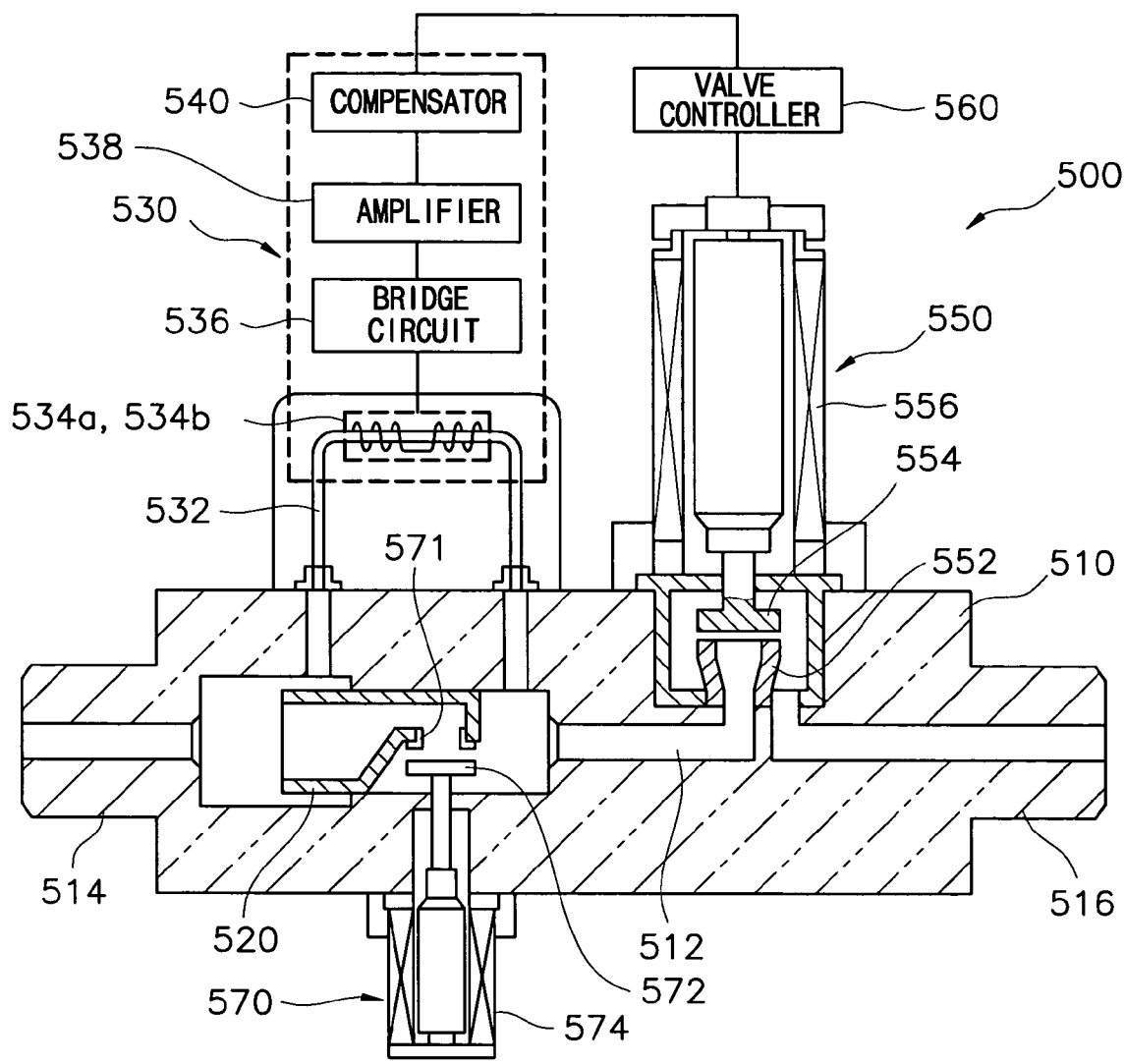
FIG. 10 is a schematic sectional view illustrating a mass flow controller according to yet another exemplary embodiment of the invention.

FIG. 10 is a schematic sectional view illustrating a mass flow controller according to yet another exemplary embodiment of the invention.

Referring to FIG. 10, a mass flow controller 500 according to yet another exemplary embodiment includes a base 510, a mass flow sensor 530, a first control valve 550, a valve controller 560 and a second control valve 570.

The base 510 connected to a fluid pipe has a long passage 512 through which a fluid passes, an inlet portion 514 for introducing fluid from the fluid pipe into the passage 512 and an outlet portion 516 for releasing the fluid from the passage 512. A bypass portion 520 is disposed in the passage 512 adjacent to the inlet portion 514.

A mass flow sensor 530 includes a sampling pipe 532, a first thermal resistance 534a, a second thermal resistance 534b, a bridge circuit 536, an amplifier 538 and a compensator 540. The sampling pipe 532 is connected between a first portion of the passage 512 adjacent to an inlet end of the bypass portion 520 and a second portion of the passage 512 adjacent to a releasing end of the bypass portion 520. In addition, another capillary bypass portion (not shown) may be installed between the inlet portion 514 of the base 510 and the bypass portion 520.

The valve controller 560 compares a signal corresponding to the mass flow measured by the mass flow sensor 530 to a standard signal corresponding to a standard flow, and then controls the operation of the first control valve 550. The valve controller 560 properly controls the mass flow of the fluid passing through the passage 512.

The first control valve 550 includes a valve seat 552, a first valve body 554 for controlling the mass flow of the fluid passing through the passage 512 and a first driving unit 556 for driving the first valve body 554.

The second control valve 570 includes a second valve seat 571 connected to the releasing end of the bypass portion 520, a second valve body 572 for controlling the full scale of the mass flow of the fluid passing through the porous bypass portion 520 and a second driving unit 574 for driving the second valve body 572 to control the opening between the second valve seat 571 and the second valve body 572.

The second valve seat 571 has a ring shape. Preferably, the second valve body 572 has a disc valve head including a disc shape corresponding to the shape of the second valve seat 571. Also, a poppet valve head having a cone shape may be employed in the second valve body 572.

Since the elements according to yet another exemplary embodiment are previously described in relation to the mass flow controller 200 of FIG. 3, illustrations of the elements are omitted.

According to the exemplary embodiments of the present invention, the first control valve controls a mass flow of a fluid passing through the passage of the mass flow controller and the second control valve controls a full scale of the mass flow. Accordingly, the mass flow controller according to the embodiments of the present invention can be employed in different processes, e.g., semiconductor fabricating processes, using various kinds of gases.

Having described the exemplary embodiments for the stocker and the transfer system, it is noted that modifications and variations can be made by persons skilled in the art in light of the above teachings. It is therefore to be understood that changes may be made in the exemplary embodiments of the present invention disclosed which is within the scope and the spirit of the invention outlined by the appended claims.

What is claimed is:

1. A mass flow controller comprising:
   a base having a first passage through which a fluid passes, an inlet portion for introducing the fluid into the first passage and an outlet portion for releasing the fluid from the first passage;
   a mass flow sensor connected to the first passage adjacent to the inlet portion for measuring a mass flow of the fluid passing through the first passage;
   a first control valve connected to the first passage adjacent to the outlet portion for controlling the mass flow of the fluid passing through the first passage;
   a valve controller that compares the mass flow measured by the mass flow sensor to a standard flow and for controlling the first control valve to correspond the mass flow of the fluid to the standard flow; and
   a second control valve connected to the first passage adjacent to the inlet portion for controlling a full scale of the mass flow of the fluid passing through the first passage, wherein the second control valve includes a valve body that controls an opened sectional area of the first passage and a driving unit that traverses the first passage with the valve body, wherein the valve body includes a shape corresponding to a sectional shape of the first passage and a plurality of holes through which the fluid passes.

2. The mass flow controller of claim 1, wherein the driving unit includes a solenoid.

3. The mass flow controller of claim 1, wherein the driving unit comprises:
   a motor generating a rotary force;
   a driving screw connected to the motor that is rotated by the rotary force; and
   a driven screw, connected between the driving screw and the valve body, which is reciprocally moved in straight line by the rotary force.

4. The mass flow controller of claim 1, wherein the first control valve includes a solenoid valve, a thermal valve or a piezoelectric valve.

5. A mass flow controller comprising:
   a base having a first passage through which a fluid passes, an inlet portion for introducing the fluid into the first passage and an outlet portion for releasing the fluid from the first passage;
   a mass flow sensor connected to the first passage adjacent to the inlet portion for measuring a mass flow of the fluid passing through the first passage;
   a first control valve connected to the first passage adjacent to the outlet portion for controlling the mass flow of the fluid passing through the first passage;
   a valve controller that compares the mass flow measured by the mass flow sensor to a standard flow and for controlling the first control valve to correspond the mass flow of the fluid to the standard flow;
   a second control valve connected to the first passage adjacent to the inlet portion for controlling a full scale of the mass flow of the fluid passing through the first passage; and a bypass portion through which the fluid passes disposed in the first passage adjacent to the inlet portion, wherein the bypass portion includes a plurality of capillaries, wherein the second control valve includes a valve body that opens/closes the capillaries and a driving unit that traverses the first passage with the valve body.

6. The mass flow controller of claim 5, further comprising a sampling pipe having a first end connected to a first portion of the first passage adjacent to an inlet end of the bypass portion and a second end connected to a second portion of the first passage adjacent to a releasing end of the bypass portion, wherein the sampling pipe is connected to the mass flow sensor.

7. A mass flow controller comprising:

a base having a first passage through which a fluid passes, an inlet portion for introducing the fluid into the first passage and an outlet portion for releasing the fluid from the first passage;

a mass flow sensor connected to the first passage adjacent to the inlet portion for measuring a mass flow of the fluid passing through the first passage;

a first control valve connected to the first passage adjacent to the outlet portion for controlling the mass flow of the fluid passing through the first passage;

a valve controller that compares the mass flow measured by the mass flow sensor to a standard flow and for controlling the first control valve to correspond the mass flow of the fluid to the standard flow;

a second control valve connected to the first passage adjacent to the inlet portion for controlling a full scale of the mass flow of the fluid passing through the first passage, and a bypass portion through which the fluid passes disposed in the first passage adjacent to the inlet portion, wherein the bypass portion includes a sectional shape corresponding to a sectional shape of the first passage and a plurality of second passages through which the fluid passes, wherein the second control valve comprises:

a valve body disposed on a side of the bypass portion and having a plurality of holes corresponding to the second passages; and a driving unit that varies positions of the valve body to control the full scale of the mass flow of the fluid passing through the second passages and the holes.

8. A mass flow controller comprising:

a base mounted on a gas pipe and having a first passage through which the gas passes, an inlet portion for introducing the gas into the passage and an outlet portion for releasing the gas from the passage;

a bypass portion disposed in the first passage, the gas passing through the bypass portion;

a mass flow sensor that measures a mass flow of a sample gas extracted from the gas passing through the bypass portion and generates a signal corresponding to the measured mass flow;

a first control valve, connected to the passage adjacent to the outlet portion, that controls the mass flow of the gas passing through the first passage;

a valve controller that compares the signal generated from the mass flow sensor to a standard signal and controls the first control valve to correspond the mass flow of the fluid to the standard flow; and a second control valve, connected to the first passage adjacent to the bypass portion, which controls a full scale of the mass flow of the gas passing through the bypass portion, wherein the second control valve includes a valve body for controlling an opened sectional area of the first passage and a driving unit traversing the first passage with the valve body, wherein the valve body includes a shape corresponding to a sectional shape of the first passage and a plurality of holes through which the gas passes.

9. A mass flow controller comprising:

a base mounted on a gas pipe and having a first passage through which the gas passes, an inlet portion for introducing the gas into the passage and an outlet portion for releasing the gas from the passage;

a bypass portion disposed in the first passage, the gas passing through the bypass portion;

a mass flow sensor that measures a mass flow of a sample gas extracted from the gas passing through the bypass portion and generates a signal corresponding to the measured mass flow;

a first control valve, connected to the passage adjacent to the outlet portion, that controls the mass flow of the gas passing through the first passage;

a valve controller that compares the signal generated from the mass flow sensor to a standard signal and controls the first control valve to correspond the mass flow of the fluid to the standard flow; and a second control valve, connected to the first passage adjacent to the bypass portion, which controls a full scale of the mass flow of the gas passing through the bypass portion, wherein the bypass portion includes a plurality of capillaries, and the second control valve includes a valve body that opens/closes the capillaries and a driving unit that traverses the passage with the valve body.

10. A mass flow controller comprising:

a base mounted on a gas pipe and having a first passage through which the gas passes, an inlet portion for introducing the gas into the passage and an outlet portion for releasing the gas from the passage;

a bypass portion disposed in the first passage, the gas passing through the bypass portion;

a mass flow sensor that measures a mass flow of a sample gas extracted from the gas passing through the bypass portion and generates a signal corresponding to the measured mass flow;

a first control valve, connected to the passage adjacent to the outlet portion, that controls the mass flow of the gas passing through the first passage;

a valve controller that compares the signal generated from the mass flow sensor to a standard signal and controls the first control valve to correspond the mass flow of the fluid to the standard flow; and a second control valve, connected to the first passage adjacent to the bypass portion, which controls a full scale of the mass flow of the gas passing through the bypass portion, wherein the bypass portion includes a first sectional shape corresponding to a sectional shape of the passage and a plurality of second passages through which the gas passes, wherein the second control valve comprises:

a valve body disposed on a side of the bypass portion and having a plurality of holes corresponding to the second passages; and a driving unit that varies positions of the valve body to control the full scale of the mass flow of the gas passing through the second passages and the holes.

11. The mass flow controller of claim 10, wherein the bypass portion includes a second sectional shape corresponding to the sectional shape of the first passage having a plurality of third passages, wherein the second sectional shape is disposed between the inlet portion and the first sectional shape.

* * * * *